E. HUBER.
Horse Rake.
No. 46,001. Patented Jan'y 24, 1865.
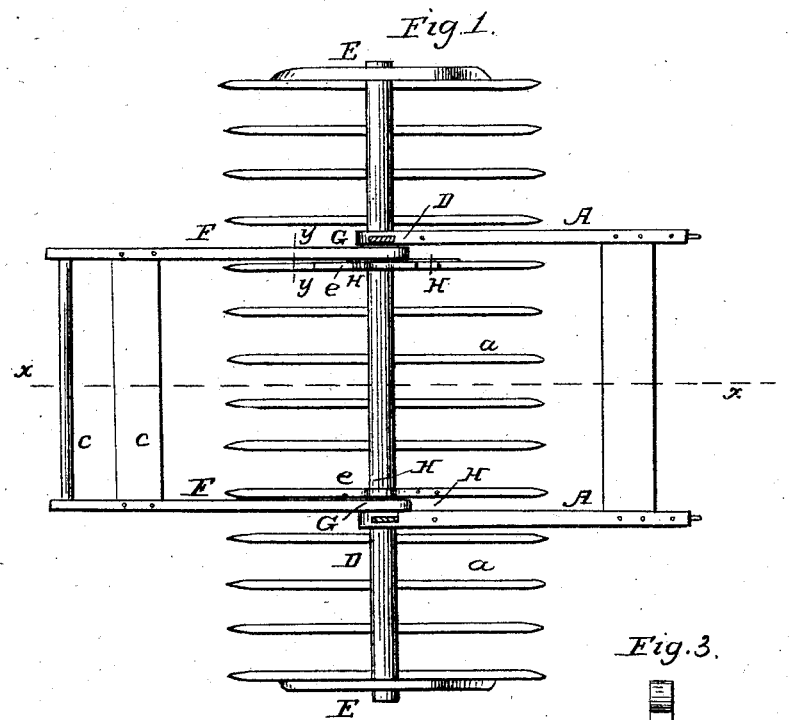
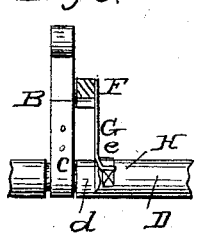
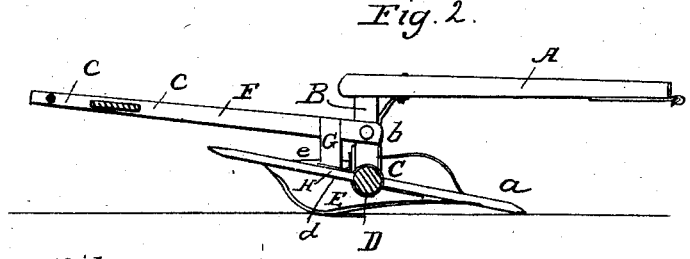
Witnesses:
C. L. Topliff
Fred Busch
Inventor:
Edward Huber
per Munn & Co
Attorneys

UNITED STATES PATENT OFFICE.

EDWARD HUBER, OF KELSO, INDIANA.

IMPROVEMENT IN HORSE-RAKES.

Specification forming part of Letters Patent No. 46,001, dated January 24, 1865.

*To all whom it may concern:*

Be it known that I, EDWARD HUBER, of Kelso, in the county of Dearborn and State of Indiana, have invented a new and Improved Hay-Rake; and I do hereby declare that the following is a full, clear, and exact description thereof, which will enable others skilled in the art to make and use the same, reference being had to the accompanying drawings, forming part of this specification, in which—

Figure 1 is a plan or top view of my invention. Fig. 2 is a side sectional view of the same, taken in the line $x \ x$, Fig. 1. Fig. 3 is a section of a portion of the same, taken in the line $y \ y$, Fig. 1.

Similar letters of reference indicate like parts.

This invention relates to a new and improved horse-rake of that class which are provided with straight teeth and arranged so as to revolve in order that they may discharge their load.

The invention consists in a novel and improved form of spring-catches for effectually retaining the rake in a proper working position while being drawn along, and admitting of a ready release of the rake when it is necessary that the same should revolve to discharge its load.

A A represent thills, to which the draft-animal is attached. These thills have each a pendant, B, secured to them near their rear ends, and the lower ends of the pendants are provided each with a metal strap, C, which form bearings for a rake-head, D, the latter being allowed to turn freely in the former. This rake-head has wooden teeth $a$ passing through it at right angles and projecting from it at equal distances at two opposite sides, and the rake-head is provided with a shoe, E, at each end, said shoes being of double form, so as to rest or run upon the earth, whichever side of the rake is uppermost. This will be fully understood by referring to Fig. 2.

F F represent handles, which are attached one to each pendant B by a pivot, $b$. The outer parts of these handles are connected by cross-bars $c$, and to each handle, near the pendants B, there is attached a pendent elastic plate, G, the lower ends of which, at their inner sides, are provided with beveled projections $d$, (see Fig. 3,) and at the rear edges of said plates G there are projections $e$, which may be formed by slitting the plates vertically and bending the portion at the rear of the slit inward, as shown more particularly in Figs. 2 and 3, a space being allowed between the projections $d$ and $e$ to receive metal plates attached to two of the rake-teeth, $a$, at each side of the rake-head. These elastic plates, with their projections, serve as catches to hold the rake in a working position as it is drawn along, and when enough hay or grain is on the front parts of the teeth of the rake the operator, by simply drawing back the handles F F, will release the plates H on the rake-teeth from the elastic plates or catches G, and the rake will, as the device is drawn along, make a half-revolution and discharge its load, the plates H, which were formerly on the teeth $a$ at the front of the rake, catching between the projections $d \ e$ of the plates G, the latter yielding or giving to admit of that result. The whole arrangement is extremely simple and efficient, and there are no parts at the front of the rake to interfere with the raking up of the hay or grain.

I claim as new and desire to secure by Letters Patent—

The spring or elastic plates G, attached to the handles F F, and provided with the projections $d \ e$, in connection with the plates H on the teeth of the revolving rake-head D, the handles being connected by pivot-bolts to pendants B on thills A, and all arranged to operate in the manner substantially as and for the purpose set forth.

EDWARD HUBER.

Witnesses:
HENRY C. VINCENT,
G. W. HARGITT.